United States Patent [19]

Beland

[11] Patent Number: 5,023,769
[45] Date of Patent: Jun. 11, 1991

[54] X-RAY TUBE HIGH-VOLTAGE POWER SUPPLY WITH CONTROL LOOP AND SHIELDED VOLTAGE DIVIDER

[75] Inventor: Robert Beland, Bellefeuille, Canada

[73] Assignee: Electromed International Ltd., Quebec, Canada

[21] Appl. No.: 447,559

[22] Filed: Dec. 7, 1989

[51] Int. Cl.$^5$ ............................................. H02M 7/155
[52] U.S. Cl. ........................................ 363/86; 338/64; 323/370; 378/112
[58] Field of Search ....................... 323/369, 370, 353; 363/86, 87; 378/111, 112; 338/64

[56] References Cited

U.S. PATENT DOCUMENTS 4,034,283  7/1977  Pellegrino .......................... 338/64
4,274,003  6/1981  Kuehnel et al. ..................... 378/112
4,412,183 10/1983  Brodie ................................. 338/64

FOREIGN PATENT DOCUMENTS 220785  8/1924  United Kingdom ................ 323/370

Primary Examiner—William H. Beha, Jr.
Attorney, Agent, or Firm—M. Lawrence Oliverio

[57] ABSTRACT

A power supply for an X-ray tube having a feedback loop for regulating the high-voltage output signal of the power supply and allowing operation from AC lines of different voltage characteristics. The single-phase components of the input AC line voltage pass through separate silicon controlled rectifiers before being applied to a step-up transformer. The high-voltage transformer output is monitored by a shielded resistor divider and processed to produce a low-voltage control signal for controlling the input rectifiers.

5 Claims, 4 Drawing Sheets

X-RAY TUBE HIGH-VOLTAGE POWER SUPPLY WITH CONTROL LOOP AND SHIELDED VOLTAGE DIVIDER

BACKGROUND OF THE INVENTION

The present invention relates in general to an apparatus for powering X-ray tubes. More particularly, the invention relates to a high-voltage power supply that is adapted to operate from a variety of AC power sources, which power sources have a variety of voltages, phases and impedances, and to provide precise control of the high-voltage output signal provided to an X-ray tube.

In a conventional X-ray tube, X-rays are produced by generating electrons by thermionic emission from a tungsten filament (cathode). The electrons are then accelerated to an anode (which may be rotating for wear averaging purposes) to generate the X-rays. The emission intensity of the tube is controlled by the filament current and by the difference in potential between the anode and cathode. Current X-ray tubes may operate at potentials of up to 200 kV. These high operating voltages make control of the X-ray tube emission level a difficult problem, typically requiring expensive components. Furthermore, at high tube currents the voltage can fall very quickly, making precise measurement of the voltage difficult. Still further, at high voltages stray capacitive coupling occurs which prevents accurate measurement of the tube voltage.

Since present X-ray tubes typically require about 200 kV to be operated, a high voltage power supply utilizing a step-up transformer is required to raise the available AC line voltage to this level. The typical AC line voltage available in hospitals and clinics varies from single-phase 220 volts AC to three phase 600 volts AC. An X-ray power supply able to operate from widely different line voltages, phases and impedances would be desirable in that line matching of the transformer to the specific AC line voltage characteristics would not be required.

Precise control of the voltage and phase of the power supplied to an X-ray tube is important to ensure proper imaging for diagnostic purposes and to avoid unnecessary exposure of the patient to X-ray radiation which does not produce a useable image. For example, during a conventional radiographic gastrointestinal analysis, the patient ingests a radio opaque liquid containing barium. When the patient ingests the liquid, the doctor turns on the X-ray generating tube at a low level and positions the patient between the X-ray tube and a fluoroscopic screen. The doctor analyzes the patient's gastrointestinal tract while the barium flows through it. When the doctor sees a part of the procedure he wants to record, he typically replaces the fluoroscopic screen with a photographic plate and increases the X-ray to a level intense enough to expose the plate.

Precise phase control is also important when an X-ray image is to be recorded by a television camera. TV cameras have well established sweep rates to which the X-ray exposure must be synchronized. If the exposure is not synchronized, the resulting picture from the TV camera has an interference pattern or jitters, which will make the picture very difficult or impossible to view. An exposure synchronized with the 60 Hz sweep rate of the TV camera will produce a coherent picture. It is also permissible to use X-ray exposures of less frequent multiples of the 60 Hz rate, for example, 30, 15 or 7.5 Hz.

Single phase and three phase power supplies each have certain advantages, depending upon the exposure rate desired. For example, three phase power supplies are commonly employed to provide continuous X-ray emissions because the voltage ripple in the rectified signal from a single-phase supply is too large, causing the X-ray tube to produce a lower value X-ray than required. Filtering capacitors to eliminate ripple are generally impractical at the high voltages employed and interfere with switching on-off times. In contrast, single phase supplies are generally used to provide a short pulsed emission.

It would thus be desirable to provide a high voltage power supply for both continuous and pulsed X-ray emissions which provides a precisely controlled output voltage and which accommodates variations in the input AC line voltage.

SUMMARY OF THE INVENTION

This invention relates to a high-voltage power supply that is adapted to operate from a variety of input AC line characteristics and provide precise control of the high voltage output signal provided to an X-ray tube.

In accordance with this invention, the separate single-phase components of the input AC line voltage are separately controlled before being applied to the primary windings of a step-up transformer. The high voltage output of the transformer is monitored and a low-voltage control signal is derived therefrom which is representative of the high voltage output. The low-voltage control signal is digitally processed for generating a phase drive signal. The phase drive signal is used to control the outputs of separate solid-state switching devices, such as silicon controlled rectifiers, through which each of the single-phase input signals pass before being sent to the transformer. The digital processor is able to learn the characteristics of the input AC line voltage to generate an appropriate phase drive signal for the desired output voltage. The digital processor also measures the AC line impedance. The response time of the control loop is made a function of the X-ray tube current in order to accommodate variations in the speed of voltage changes with varying tube current.

A resistor divider is used to measure the high-voltage output of the power supply. Because of the high voltage being measured, the divider is shielded to enable accurate measurement over a wide frequency range. The shield consists of grounded conductive segments disposed along the length of the resistor, which segments are coupled to a capacitor series having a lower dynamic impedance than the resistor. Stray capacitance couples to the shield and pick up to the resistor divider is only from adjacent shield portions which are at nearly the same potential. The divider thus behaves like a true 10,000 to 1 voltage divider at frequencies from DC up to about 50,000 Hz.

DETAILED DESCRIPTION OF THE PREFERRED EMBODIMENTS

Figure 1:
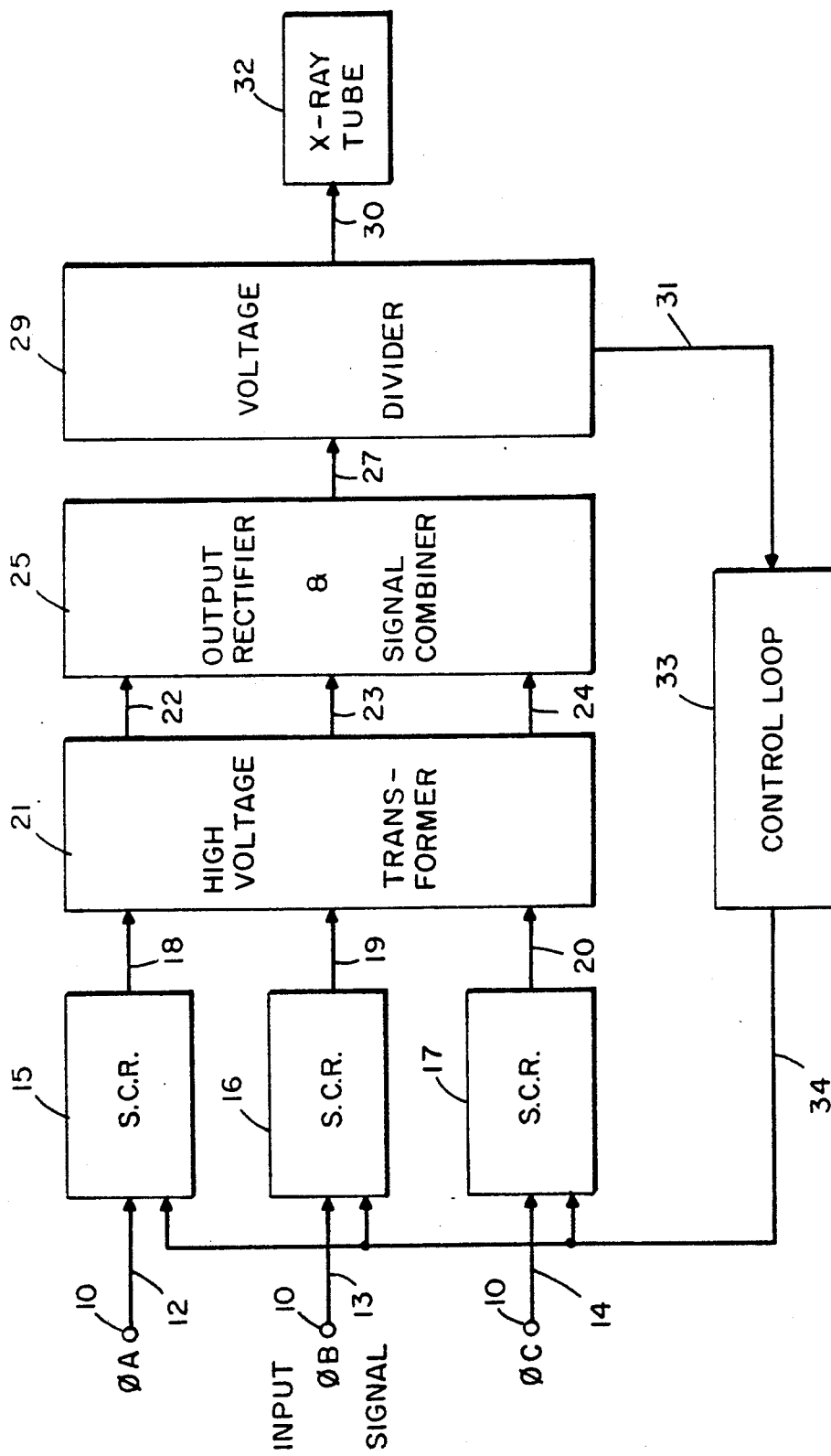
FIG. 1 is a block diagram of a high-voltage power supply constructed in accordance with the present invention.

The apparatus of this invention is embodied in a circuit for generating power for an X-ray tube. The circuit, as illustrated in the block diagram of FIG. 1, has an input signal applied at terminals 10 that can be a single or multiple-phase signal of unknown voltage. For the sake of simplicity, only signal lines are illustrated in FIG. 1; no grounds or shields are shown. It is understood that all phases of the input signal are referenced to the same ground.

In essence, each of input phase signals ($\phi A$, $\phi B$, $\phi C$ is sent on a separate line 12, 13, 14 to a separate silicon controlled rectifier (SCR) 15, 16, 17, respectively. The outputs of the SCRs are sent on separate lines 18, 19, 20 to a low-voltage to high voltage (or step-up) transformer 21 and from there on lines 22, 23, 24 to an output rectifier and signal combiner 25. The high-voltage output signal on line 27 is applied to a voltage divider 29 which generates a control signal 31 proportional to the output voltage of rectifier 25 that is processed by control loop 33 and used to generate a phase drive signal sent on line 34 to each of the SCRs 15, 16, 17 for controlling which portions of the input phase signals $\phi A$, $\phi B$, $\phi C$ are sent to the transformer 21. By thus controlling the input to the transformer, the power supply of this invention can be used in hospitals and clinics having widely ranging AC line characteristics, for example from single phase 220 volts AC, to three-phase 600 volts AC. The high-voltage output of the power supply, sent on line 30 to X-ray tube 32, can be precisely controlled from about 30 kV to about 200 kV. Alternatively, the power supply output on line 30 can be sent to a high speed solid-state high voltage regulator which provides the X-ray tube with the desired waveform.

Figure 2:
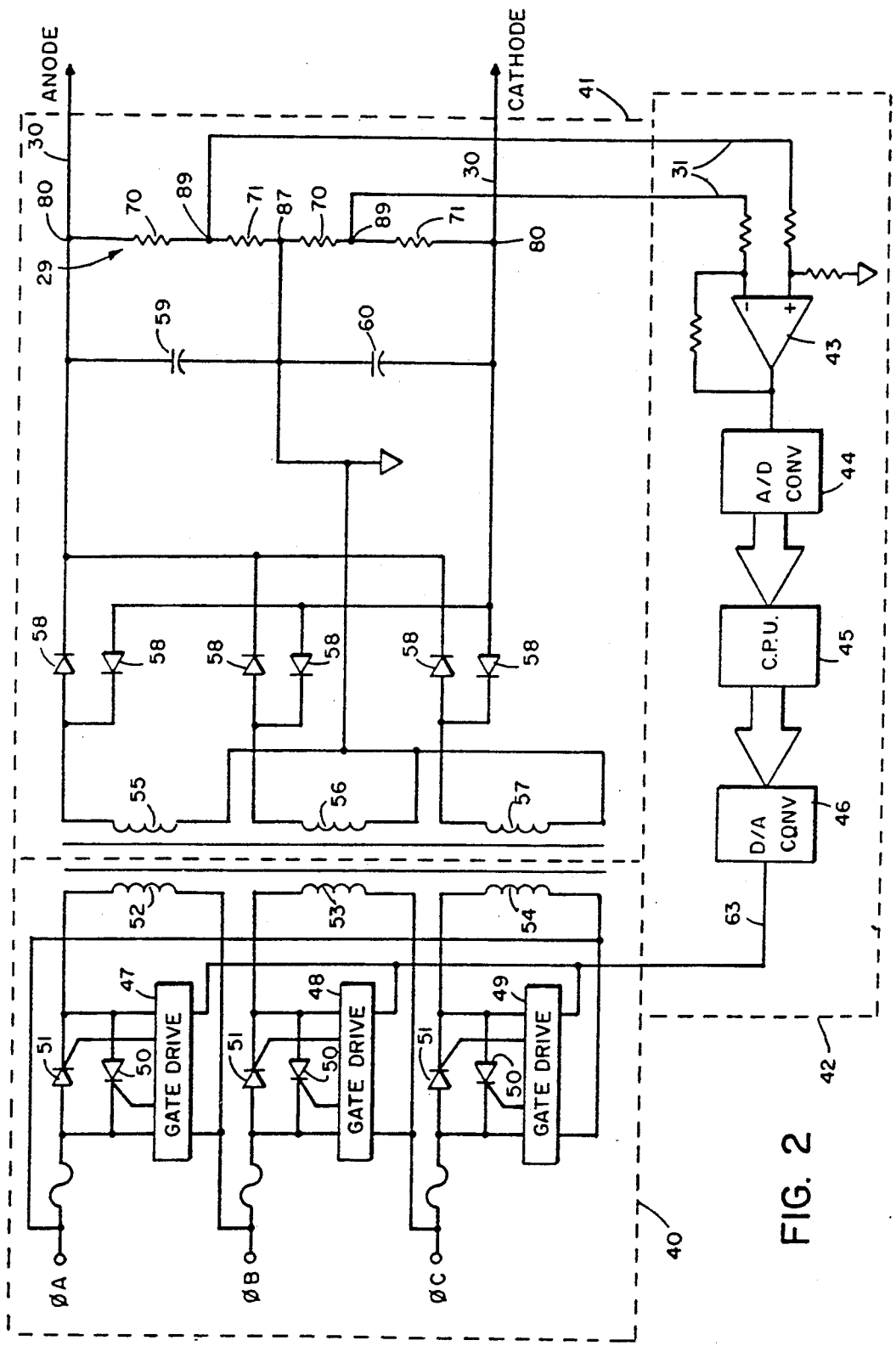
FIG. 2 is a more detailed diagram of the high-voltage power supply of this invention.

FIG. 2 describes in greater detail an embodiment of the present invention. The circuit includes three basic parts, a transformer primary circuit 40, a transformer secondary circuit 41, and a control loop 42. A high voltage output signal is sent on lines 30 to the anode and cathode of an X-ray tube and is monitored by means of a voltage divider 29. A low voltage control signal produced by the voltage divider and proportional to the voltage on lines 30 is sent on lines 31 in series to a difference amplifier 43 which amplifies the control signal, an analog to digital (A/D) converter 44 which converts the analog control signal to a digital control signal, and a central processing unit (CPU) 45 which, when programmed with the input kV required for the desired X-ray exposure, furnishes a predetermined digital phase drive signal. The digital phase drive signal output by the CPU is sent to a digital-to-analog (D/A) converter 46 which converts it to an analog phase drive signal that is sent to gate drive circuits 47, 48, 49. Each gate drive circuit controls two silicon controlled rectifiers 50, 51 which supply input voltage to one of three parallel primary windings 52, 53, 54 of the high-voltage transformer. The stepped up voltage signals on the three parallel secondary windings 55, 56, 57 of the transformer are rectified by a three-phase full-wave bridge comprising output rectifiers 58, filtered by two high-voltage capacitors 59, 60, and sent to voltage divider 29. The CPU, by continuously monitoring the voltage between the anode and cathode, controls the gate drive circuits to obtain optimum kV for the exposure.

Figure 3A:
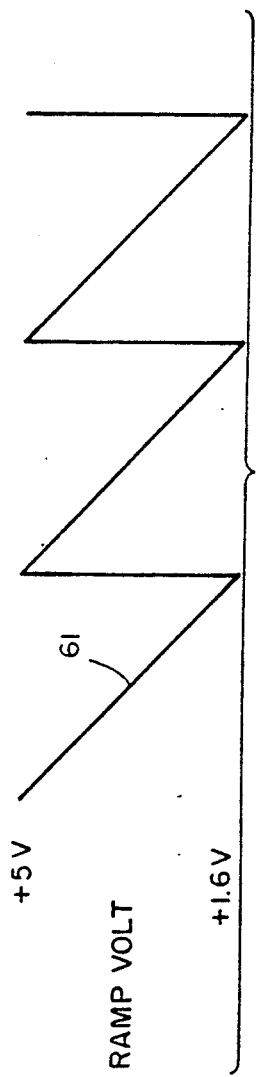
FIGS. 3A-3B are waveforms associated with the input phase control employed in this invention.
Figure 3B:
Figure 4:
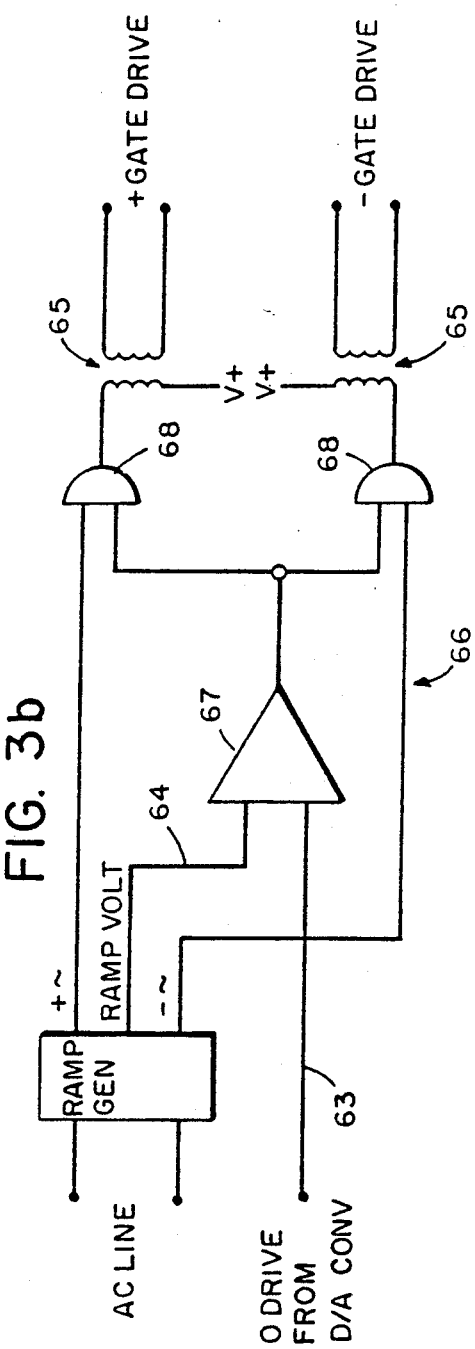
FIG. 4 is a more detailed diagram of the solid state switching devices for accomplishing the input phase control.

As shown in FIGS. 3A-3B, each gate drive circuit includes a ramp generator which produces a ramp signal 61 that starts at +5 volts at the zero crossing of the AC single phase sine wave 62 and ramps down to +1.6 volts at the half cycle. The phase drive signal on line 63 is compared with the ramp signal 61 on line 64 by comparator circuit 66 (FIG. 4), and each time the ramp signal goes below the phase drive signal the corresponding SCR receives a gate pulse through the pulse transformer 65. Comparator circuit 66 includes OR gate 67 followed by AND gates 68. Thus, a phase drive signal of 5.0 volts produces full conduction of the SCRs, a phase drive of 3.3 volts gives 90° of conduction, and a phase drive below 1.6 volts turns all SCRs off. Thus, by the use of phase control on the primary windings of the transformer, wide variations of the AC input line voltage can be accommodated to achieve a precisely controlled output voltage.

The secondary circuit 41 has one end of each transformer secondary winding 55, 56, 57 tied to ground. This enables the transformer primary to be wound directly on the transformer core (600 volts insulation) and then the secondary can be wound with no high-voltage insulation between the primary and the ground side of the secondary. This reduces the size of the core and of the transformer. The remainder of the secondary circuit consists of a six-phase, additive, full wave bridge with each rectifier 58 shown consisting of 25 controlled avalanche rectifiers in series, followed by two capacitors 59, 60, and two 10,000 to 1 voltage dividers 29. Each divider consists of three 20 meg ohm resistors 70 in series with a 6.04K ohm resistor 71 tied to zero volts DC. The large energy storing capacitors 59, 60, coupled with the input phase control, produce a stable output voltage with minimum ripple. The input AC line ripple, at two to six times the line frequency, is substantially eliminated.

The control loop 42 consists of converter circuits which provide the CPU 45 with feedback information on the input kV and allow the CPU to control the phase drive to the primary circuit. The control loop must function under the following difficult conditions: open loop gain which is highly non-linear; loop response which varies with line voltage and impedance; and loop response time which varies with X-ray tube current. Thus, during a preparation delay before an X-ray exposure, the software in the CPU monitors the relationship between the phase drive signal and the resulting high-voltage output signal to compensate for changes in the AC line. Variations in AC line impedance are measured during an exposure. After the power supply has performed about 15 X-ray exposures, the software has "learned" the line characteristics, stored them, and is able thereafter to predict the response of the loop. The closed loop control system, which includes software running on the computer, uses proportional, integral, and differential terms in order to optimize the overall performance. The integral term, which is comparable to loop response time, is made a function of the X-ray tube current because the voltage change varies with tube current. At a very high tube current the tube voltage can fall as much as 40 kV in 10 ms. In contrast, at very low tube currents, the 0.5 μF capacitors take ten seconds to drop 40 kV.

In order to obtain maximum performance from the closed loop control system, very accurate feedback information is required. This is difficult because the resistor divider is measuring potentials as high as 80 kV, which requires very high resistor values. Furthermore, relative potentials can change in the high voltage tube circuit at rates as high as 1000 volts/microseconds and stray capacitive coupling to the voltage divider resistors makes accurate transient response of the closed loop difficult. A straight forward resistor/capacitor divider would require one percent high voltage capacitors which do not change with applied voltage, and such parts are not generally available.

The present invention thus uses a shielded resistor divider which prevents stray capacitance from adversely affecting the feedback information provided to the control loop. The circuit utilizes a series of nearly complete shields around the resistor divider with each shield tied dynamically to about the same potential as that part of the divider it is shielding. Stray capacitance is thus coupled to the shield and consequently, signal pick-up to the divider comes only from the adjacent shield at nearly the same potential. The divider thus behaves like a true 10,000 to 1 voltage divider at frequencies from DC up to about 50,000 Hz.

Figures 5, 6:
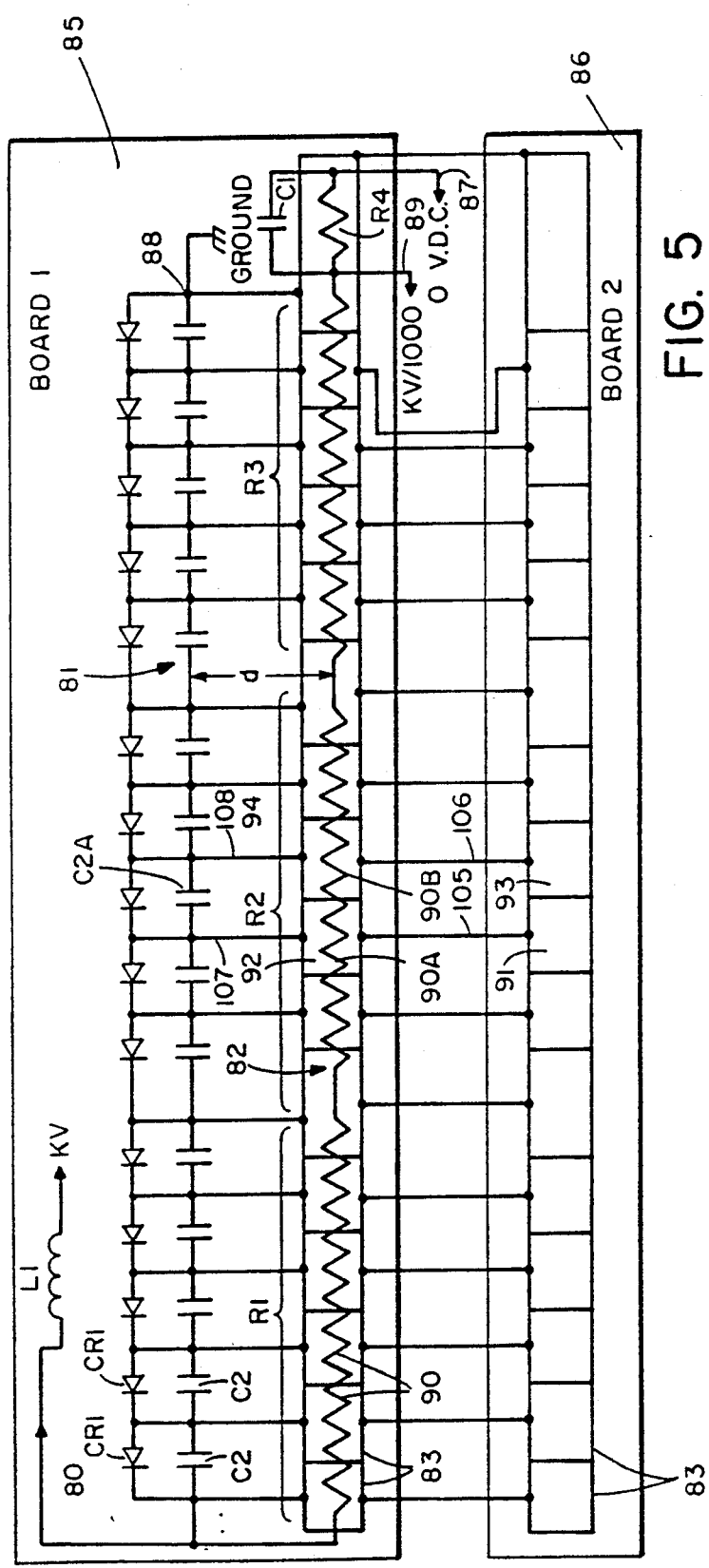
FIG. 5 is a schematic diagram of the shielded resistor divider in accordance with the present invention, showing top plan views of the first and second boards.
FIG. 6 is a schematic cross-sectional view of a portion of the shielded resistor divider of FIG. 5, showing the second board disposed above the first board.

As shown in FIG. 5, the divider itself consists of three high ohmic value resistors R1, R2, R3 in series with a low ohmic value resistor R4 tied to zero volts DC, forming resistor series 82. A capacitor C1 in parallel with resistor R4 provides a pole for infinite frequency gain at about 160 kHz, to eliminate high frequency pick up. The shield includes fifteen capacitors C2 in series, forming capacitor series 81. Fifteen diodes CR1 are provided in parallel with these capacitors to clamp the output voltage at terminal 80 to prevent the output voltage from reversing polarity during an X-ray tube arc. Conductive metallic shield segments 83 above and below the resistor divider 82 are coupled to the capacitor series 81 for dissipating stray capacitance.

FIG. 5 shows a top view of a first board 85 containing the resistor series 82, capacitor series 81 and conductive segments 83, and a top view of a second board 86, showing additional conductive segments 83. Boards 85 and 86 are stacked as shown in FIG. 6, with board 86 above board 85. The four resistors R1, R2, R3, R4 are set forth in a straight line along the length of the board. A terminal 80 at one end of the series is connected to either the anode or cathode (as shown in FIG. 2) and an opposing terminal 87 to zero volts DC. Terminal 89 between R3 and R4 provides the low voltage control signal on line 31. The capacitor series 81 is set forth in a straight line parallel to and spaced apart a predetermined distance d from the resistor series 82 along the length of the board. One end of the capacitor series is also tied to the anode or cathode at terminal 80 and the other end is tied to ground at terminal 88. A series of 15 diodes CR1, each one in parallel with one of the capacitors C2, are disposed along the length of the board adjacent to the capacitor series with opposing ends tied to the same end terminals as the capacitor series.

The resistor series 82 is divided into 15 portions 90 by two series of paired conductive segments which are disposed alternatively on opposing sides of the boards 85 and 86. As shown in FIG. 6, a first series of paired segments includes a first member 91 on the inner face of board 86 and a second member 92 on the outer face of board 85. A second series includes a third member 93 on the outer face of board 86 and a fourth member 94 on the inner face of board 85. By inner faces it is meant the surfaces 100, 101 of boards 85 and 86 adjacent one another, the opposing surfaces 102, 103 being the outer faces. The first and fourth members 91, 94 conductively engage the adjacent portions 90A, 90B of the resistor divider. The first and second members 91, 92 are conductively joined by a screw 105 extending through the boards. Likewise, the third and fourth members 93, 94 are joined by a screw 106 extending through the boards. A capacitor C2A is coupled between adjacent pairs of paired conductive segments 91, 92 and 93, 94 respectively by conductors 107, 108. The conductors 107, 108 are on opposing surfaces of board 85 and connect second member 92 and fourth member 94. In this manner, each shield pair (e.g., 91, 92) is tied dynamically to about the same potential as that part of the divider (e.g., 90A) it is shielding so that any stray capacitance which reaches the divider comes only from the adjacent shield pair (e.g., 93, 94) at nearly the same potential.

The predetermined distance d between the resistor series 82 and capacitor series 81, as well as the size and placement of the conductive segments 90, is determined by the values of the resistors R1, R2, R3 being used and the potentials being measured. Depending upon the frequency response and shielding characteristics desired, the physical location of the various components and the dimensions thereof are adjusted.

The voltage divider circuit additionally includes inductor L1. The combination of inductor L1 and capacitor series 81 form a tuned circuit that limits the transient voltage rate applied to the X-ray tube power supply in the case of an X-ray tube arc-over. When an X-ray tube arcs over, the rise time of the high voltage pulse may be on the order of a few nanoseconds. A voltage change with respect to time of such a high rate may damage the components in the high voltage DC power supply. Therefore, to limit the transient voltage change with respect to time to a value that will not destroy the components in the high-voltage DC power supply, the values of L1 and the capacitance of capacitor series 81 are selected to form a tuned circuit with a resonance frequency of approximately 100,000 Hz. The rise time of the transient voltage is thus limited to approximately 2.5 microseconds which is slow enough to protect components in the high-voltage DC power supply. The tuned circuit does not absorb the transient voltage, but reduces its rise time so that it does not destroy a power supply component. The transient protection circuit including inductor L1, capacitor series 81, and diodes CR1 in effect changes the V/dt to a rate that is slow enough to prevent damage to components in the high-voltage DC power supply.

Having described a limited number of embodiments of the present invention, it should now be apparent to those skilled in the art that numerous other embodiments and modifications are contemplated as falling within the scope of the present invention as defined by the appended claims.

What is claimed is:

1. A shielded resistor circuit comprising:
   a resistor means having opposing end terminals; and
   a shield for preventing electrical noise from interfering with the operation of the resistor means, the shield including:

a plurality of paired conductive members disposed along the length of the resistor means and having opposing end terminals, the pairs of conductive members separating the resistor means into separate portions by providing alternating first and second pairs of conductive members along the length of the resistor means;

a capacitor series comprising a plurality of serially connected capacitor means disposed a predetermined distance from the resistor means and having opposing end terminals, each capacitor means being connected between adjacent first and second pairs of conductive members, the end terminals of the conductive members being connected to the end terminals of the capacitor series, and the dynamic impedance of the capacitor series being less than the dynamic impedance of the resistor means;

wherein when the end terminals of the resistor means are connected between a higher-voltage potential and a lower voltage potential, and the end terminals of the capacitor series are connected between the higher-voltage potential and ground, electrical noise is coupled to the capacitor series and does not interfere with the resistor means.

2. The circuit of claim 1, further comprising an inductor means intercoupled with said capacitor means to form a tuned circuit means for limiting the rate of change of a transient voltage to a predetermined value.

3. The circuit of claim 2, further comprising a plurality of serially connected diode means, each of the diode means being connected in parallel with one of the capacitor means for preventing the voltage across the resistor means from reversing polarity.

4. A shielded resistor circuit comprising:

a first insulating sheet and a second insulating sheet each having opposing inner and outer faces, the sheets being disposed in parallel with their inner faces adjacent one another;

a resistor means disposed between the inner faces;

a first series of paired conductive members disposed adjacent the resistor means, each pair of the first series comprising a first member disposed on one of the inner faces and a second member disposed on the outer face opposing the other inner face, and means connecting the first and second members;

a second series of paired conductive members disposed adjacent the resistor means, each pair of the second series comprising a third member disposed on the outer face opposing the one inner face and a fourth member disposed on the other inner face, and means connecting the third and fourth members, each pair of the second series being disposed between two pairs of the first series, the combined first and second series having opposing end terminals;

a capacitor series comprising a plurality of serially connected capacitor means disposed between the inner faces a predetermined distance from the resistor means and having opposing end terminals, each capacitor means being connected to an adjacent pair of the first series and pair of the second series, the end terminals of the conductive members being connected to the end terminals of the capacitor series, and the dynamic impedance of the capacitor series being less than the dynamic impedance of the resistor means;

wherein, when the end terminals of the resistor means are connected between a higher-voltage potential and a lower-voltage potential, and the end terminals of the capacitor series are connected between the higher-voltage potential and ground, electrical noise is coupled to the capacitor series and does not interfere with the resistor means.

5. Apparatus for supplying operating power to an X-ray generating source comprising:

a power supply producing high-voltage output signals for operating an X-ray generating source; and means for monitoring the high-voltage output signal comprising a shielded resistor circuit across which the high-voltage output signal is measured, the shielded resistor circuit comprising:

a resistor means having opposing end terminals; and a shield for preventing electrical noise from interfering with the operation of the resistor means, the shield including:

a plurality of paired conductive members disposed along the length of the resistor means and having opposing end terminals, the pairs of conductive members separating the resistor means into separate portions by providing alternating first and second pairs of conductive members along the length of the resistor means;

a capacitor series comprising a plurality of serially-connected capacitor means disposed a predetermined distance from the resistor means and having opposing end terminals, each capacitor means being connected between adjacent first and second pairs of conductive members, the end terminals of the conductive members being connected to the end terminals of the capacitor series, and the dynamic impedance of the capacitor series being less than the dynamic impedance of the resistor means;

wherein when the end terminals of the resistor means are connected between a higher-voltage potential and a lower-voltage potential, and the end terminals of the capacitor series are connected between the higher-voltage potential and ground, electrical noise is coupled to the capacitor series and does not interfere with the resistor means.

* * * * *